United States Patent Office 2,849,414
Patented Aug. 26, 1958

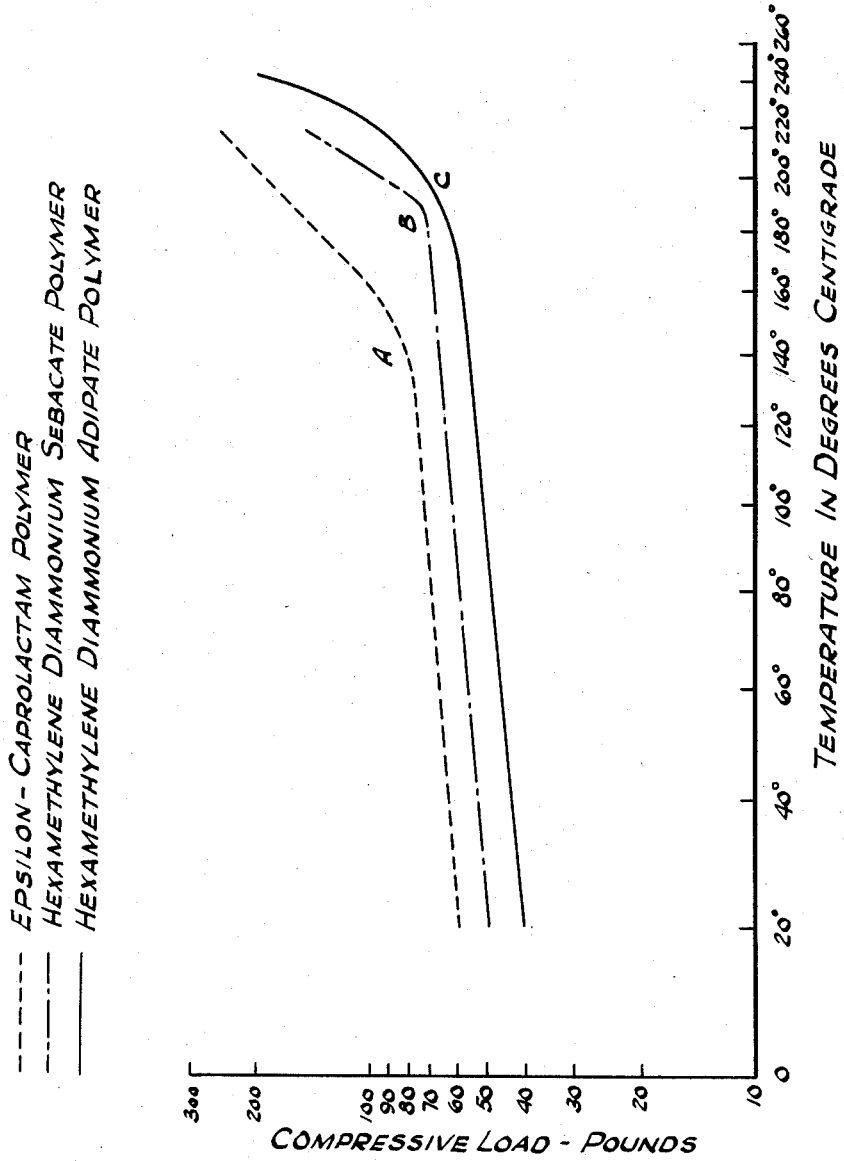

2,849,414

NYLON-CARBON BLACK COMPOSITION AND ARTICLE

Louis L. Stott, Wyomissing, Pa., assignor to The Polymer Corporation, a corporation of Pennsylvania Application September 21, 1954, Serial No. 457,390

4 Claims. (Cl. 260—37)

This invention relates to the art of molding high molecular weight synthetic linear polyamides and is a continuation-in-part of applications Serial No. 227,283 filed May 19, 1951 in the name of Louis L. Stott, now abandoned, and Serial No. 272,966, filed February 23, 1952, now Patent 2,695,425, issued November 30, 1954, in the name of Louis L. Stott. The synthetic polymeric materials used in the practice of this invention are the synthetic linear polyamides of the general type described in the United States Patents 2,071,250, 2,071,254 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above, or as otherwise identified hereinafter, can be obtained, for example, by self-polymerization of monoamino-monocarboxylic acid, or by reacting a diamine with a dibasic carboxylic acid in substantially equimolecular amounts, it being understood that reference herein to the amino acids, diamines, and dibasic carboxylic acids, is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the interpolymers, as well as in the simple polyamides, the average number of carbon atoms separating the amide groups is at least two. On hydrolysis with hydrochloric acid, the amino acid polymers yield the amino acid hydrochloride, and the diamine-dibasic acid polymers yield the diamine hydrochloride and the dibasic carboxylic acid. In any case, the polyamides are limited to those which are soluble in phenol at room temperature and are insoluble in ethylene glycol except at temperatures above about 140° C. For the sake of simplicity the linear polyamides described above will be referred to herein as nylon.

Although these materials were originally introduced as fibers for use in the textile industry, they have subsequently been made available as raw materials for the molding and extrusion industries. The high melting nylons, such as polyhexamethylene adipamide, and polyhexamethylene sebacamide, are characterized by relatively sharp melting points and high fluidity in the molten condition in comparison to other thermoplastic materials, such as cellulose acetate and polystyrene. These characteristics have made compression molding of these nylons difficult. At the present time shaped nylon pieces are prepared commercially, either by machining solid nylon, such as nylon rod, or by melting nylon and forming it by injection molding. Both of these methods have certain drawbacks. Bearings machined from nylon rod, for instance, are relatively expensive to make and involve much waste. Furthermore, the manufacturing techniques for producing nylon rod, particularly for the larger sizes, usually introduce severe strains which must be removed by conditioning. The injection molding technique requires complicated and expensive apparatus, high cost molds, and also frequently results in a product having many strains. These strains cause bearings prepared by injection molding to seize readily if large clearances are not provided. The presently used molding techniques depend upon heating a polyamide above its melting point and exerting pressure on the molten material. The strains produced in the resultant article come as a consequence of cooling the molten material and, at least in part, are due to a relatively high volumetric shrinkage on solidification.

In accordance with my United States application Serial No. 227,283, filed May 19, 1951, molded nylon articles containing fillers are described. These articles are made by compressing nylon powder having an ultimate particle size of less than 40 microns and a finely divided filler with sufficient pressure so that they may be handled. The compressed article is thereafter sintered by heating to a temperature just below the melting point of the nylon. Such fillers are capable of imparting special desirable characteristics to nylon molded articles. Among such general characteristics are increased dimensional stability and decreased sensitivity to humidity.

It is technically extremely difficult to get a uniform dispersion of carbon black in molten nylon, particularly where the filler is desired in high concentrations. For example, such attempts to incorporate 15 or 20 percent carbon black with nylon by the conventional method of mixing the carbon black with molding powder is unsatisfactory. When carbon black and the molding powder are thus mixed and the mixture is heated, poor distribution and a tendency for the filler to settle result. If the filler is added to molten nylon, segregation of the filler occurs due to difference in specific gravity.

It is an object of this invention to produce powder and molded articles of modified nylon, i. e. nylon having a filler which imparts physical characteristics which differ from those of usual nylon articles. Another object is to prepare molded nylon articles having greater dimensional stability during humidity changes than unmodified nylon articles. Still another object is to produce nylon powder and articles having carbon black evenly distributed throughout the finished article. Carbon black being of low density is relatively inexpensive on a volumetric basis. A still further object is to produce a nylon powder mixture having a relatively low fill ratio, which is particularly important to avoid the necessity of using special press equipment with extra long stroke. These and other objects which will become apparent hereafter may be accomplished as follows:

Nylon powder having an ultimate particle size of less than 40 microns is mixed thoroughly with carbon black and compressed to the desired shape with sufficient pressure so that the shaped green article may be handled. The compressed article is thereafter heated to a temperature sufficient to sinter the particles of nylon together without inducing any substantial molten phase. The article may be annealed to remove any residual strains.

It is essential that a substantial portion of the nylon particles be below about 40 microns in diameter and preferably below 25 microns, but the optimum size appears to be 10 microns or less. Nylon of this size may be obtained in accordance with the process described in United States application Serial No. 95,587, now United States Patent 2,592,616, filed in the names of Louis L. Stott and Laurence R. B. Hervey on May 26, 1949; United States application Serial No. 273,566, now U. S. Patent 2,742,440, filed in the names of Louis L. Stott and Laurence R. B. Hervey on February 26, 1952; and the United States application Serial No. 202,405, now United States Patent 2,639,278, filed in the names of Louis L. Stott and Laurence R. B. Hervey on December 22, 1950. These methods disclose that nylon may be dissolved in mixtures of lower alcohols and water or in methanol alone under pressure and at elevated temperatures, and that nylon may be dissolved in polyhydric alcohols merely by heating them together. Oxygen is excluded during the heating step. Upon cooling, the nylon precipitates as a fine powder which, when washed and dried, is suitable for the present process. In the case of polyhydric alcohols cooling may conveniently be accomplished by adding water to the hot nylon solution. If waste nylon is employed, undissolved material is preferably removed when the polymer is in solution.

It has been found preferable to use nylon which has been prepared in the manner just described. This may be because of the difficulty in obtaining material having an average ultimate particle size of less than 40 microns as is obtained by the process described. It is also to be recognized that the product obtained by precipitating nylon as described in the above-identified application is crystalline in character and becomes more so upon sintering as disclosed by X-ray diffraction patterns. But for whatever the reason, the nylon must be reduced in size to the order of less than 40 microns in diameter.

I have found that contrary to established procedures for handling thermoplastic materials it is possible to cold press the polyamide-carbon black mixture, remove the article from the mold and subsequently sinter finely divided polyamide materials into finished articles, provided the starting particle sizes are of the order indicated. No precautions need be observed with respect to the type of metals coming in contact with the nylon. Although carbon black may be added in amounts of from 5 percent up to 85 percent by bulk volume of the nylon-filler mixture to advantage, a preferable carbon black concentration range is from about 20 to 70 percent of the total bulk volume. However, lower percents of carbon black also give finished molded articles of good strength.

The use of carbon black as a filler serves to reduce hygroscopic or thermal expansion as compared to articles made entirely of nylon, and at the same time aids materially in securing dimensional accuracy through reduced distortion during sintering. In addition, carbon black-nylon mixtures exhibit better fill ratios than that shown by the finely divided nylon alone. Thus, fill ratios as low as 3 have been attained with a carbon black-nylon mixture compared to about 4 for nylon alone for material with suitable strength after sintering. Since this fill ratio represents the ratio of volume of material which must be put into a mold to the final volume of the molded article, it will be seen that the lower the fill ratio, the less volume of molding composition is required and the smaller the mold which can be used.

To incorporate the carbon black, it is mixed with the nylon powder; it may be added to the polyamide raw material, the polyamide dissolved in an agent which is a swelling agent for the polymer at elevated temperatures and a non-swelling agent at room temperature, and the two precipitated by cooling; the carbon may be added to the polyamide solution before precipitation; it may be added to the precipitated polyamide while dispersed in said agent; after precipitating the carbon may be added and thoroughly mixed with the wet, drained polyamide before or after washing; or the carbon may be added to the dried polyamide which has subsequently been wetted. In all cases the carbon is added to the polyamide when wet. The mixture of nylon powder with carbon black is briquetted by the use of sufficient pressure to cause the resultant shaped article to withstand moderate shocks incident to its handling. The pressures employed range generally between about 10 tons per square inch and 50 tons per square inch. The pressures do not seem to be critical, but it has been found that about 25 tons per square inch is a very satisfactory pressure. Pressure in the order of 3 tons per square inch yields a briquette which may be handled only with considerable care and when fired has a compressive strength of less than one-half that of a similar piece pressed at 25 tons per square inch. Pressures in excess of 75 tons per square inch are not required. The resultant "cold" preformed article is then sintered by heating it under non-oxidizing conditions to a temperature below the melting point of the nylon present for a time sufficient to cause the article to be strong and hard when cooled. In accordance with application Serial No. 272,966, filed February 23, 1952, in the name of Louis L. Stott, I have found that if several pieces are molded from nylon powder at room temperature and sintered at various temperatures ranging from slightly above room temperature up to nearly the melting point and the resultant pieces are tested for compression strength, that an interesting phenomenon becomes apparent. Referring now to the drawing, the curves are plots of the loads required to break bearings 1 inch long, ½ inch I. D. and ¾ inch O. D. when the loads are applied along the surface perpendicular to the axis. Curve A is a plot of epsilon-caprolactam polymer sintered at various temperatures; curve B is a plot of the loads required to break similar bearings of polyhexamethylene sebacamide sintered at various temperatures; and curve C is a plot of the loads required to break similar bearings of polyhexamethylene adipamide at various temperatures. The bearings were sintered in vacuo.

It will be noted that in the accompanying drawing, the log of the compressive load is plotted against the reciprocal of the temperature in degrees absolute (degrees centigrade $+273°$. Since two substantially straight lines result from plotting increasing sintering temperatures for each material, it is apparent that below the inflection point on any curve a single process is operative which is a function solely of an activation energy and the temperature. Above the inflection point a new process is operative with a different activation. It is this second process which forms part of this invention since sintering below the inflection point is ineffective. This inflection point is displayed not only for the pure polyamides but also for mixtures containing carbon black.

It is not known why the strength suddenly begins to increase at a rapid rate, but the inflection point may be easily determined for any given polyamide. Reference will be made hereafter to the break in the curve as the inflection point. The temperature to which the polyamide should be heated is therefore above the inflection point and below the point where any substantial molten phase occurs. If any substantial amount of molten phase occurs, the article warps, blisters and becomes unusable. As may be observed, the temperature to which the carbon black mixtures containing polyhexamethylene adipamide should be sintered is from about 200° C. to about 263° C., those containing polyhexamethylene sebacamide is from about 190° C. to about 220° C., and those containing the polymer of epsilon-caprolactam is from about 160° C. to about 215° C.

Before molding the powder mixture it may be granulated, if desired, to obtain freer flowing powder. Molding is advantageously accomplished by placing the granulated powder mixture in a mold or otherwise compressing it as by passing it through pressure rollers.

After forming, the cold preformed nylon-carbon black article is then sintered by heating it under non-oxidizing conditions. The time range is usually between 2 to 30 minutes.

The presence of moisture in the nylon powder can, under some conditions, cause cracks to appear in the article on sintering. This is particularly true when the sintering is done in hot oil as contrasted with sintering in vacuo. It has been found that relatively small bearings containing 3 percent moisture or more before sintering, will crack if immersed directly in hot oil. On the other hand, a similar bearing first immersed in cold oil and then the oil raised slowly to the sintering temperature will be free from cracks. It is therefore preferred to keep the moisture content of the formed nylon article before sintering as low as possible, preferably below about 1 percent moisture. In the case of large solid objects, the presence of moisture is more critical and a vacuum drying step either on the powder or the preformed article is desirable.

In the above discussion the pressing has been assumed to take place at about room temperature. If the temperature of the mold is raised to a point close to the melting point of nylon, very unsatisfactory material is produced. A somewhat elevated temperature may be tolerated, however, and such temperature appears to add some strength to the "green" article, but does not materially affect the finished product when sintered. It is essential therefore that the pressing be accomplished at a temperature below that at which any molten phase can occur and preferably at or about room temperature.

The reason for the extremely tight bond obtained by my process is not apparent. It may be that the high pressure employed, followed by sintering, causes sufficient reorientation analogous to crystal growth to secure adequate bonding. But whatever the reason may be, it is totally unexpected that a strong bond would form, and it is unexpected that any amounts of carbon black up to 85 percent of the total bulk volume yield articles of surprising strength.

A further unexpected advantage is secured by my technique in that powder obtained from waste textile nylon, such as stocking material, may be successfully used either alone, or in conjunction with powder obtained from virgin nylon. All attempts to melt and mold or extrude waste nylon have resulted heretofore in excessively brittle products not suitable for commercial use. It is apparent, therefore, that the high cost factors restricting the wider use of molding nylon shapes have been largely overcome by the process described herein. The special and expensive tools required by the present techniques are replaced by the relatively simple and available cold pressing equipment used in the powder metallurgy art and the relatively expensive virgin nylon may be substituted in whole, or in part, by nylon obtained from nylon scrap and textile waste, such as textile clippings and stockings.

If close tolerances are not required, the pressed, sintered articles may be satisfactorily used without subsequent conditioning or annealing to remove strains which may occur to a minor extent in the molded articles. In some bearings and other articles, the necessity for close tolerances requires that the article be free from slight additional shrinkages in service. Annealing is accomplished by simply heating the article, preferably under non-oxidizing conditions, to a temperature under, but preferably close, i. e., within 50° C. to the melting point of the polyamide for a few minutes to an hour and slowly cooling. Holding for longer times at lower temperatures also reduces strains. In some cases, annealing may be combined with the sintering step to avoid two furnace treatments.

If desired, lubricating agents in minor amounts may be added to facilitate and improve uniformity of the shaped piece and to aid the removal of the pressed piece from the die or for other purposes. Useful lubricants include stearates such as zinc stearate, hydrogenated cotton seed oil, or other greasy or soapy substances which may be either intermixed with the carbon filled nylon powder or coated on the die surfaces. Small amounts of other minor ingredients may be added to improve the flowing properties of the dry powder or to aid in obtaining uniform physical properties in the sintered product.

One of the important uses for pressed and sintered finely divided nylon containing carbon black has proved to be in the field of wear resisting parts such as bushings and bearings. Polyhexamethylene adipamide and carbon black, in particular, have exhibited considerable merit for bushings operating at light loads, especially where good strength and wear resistance is required. In many instances these bushings have shown superior wear resistance to similar pieces made from powdered bronze. The bearings made in accordance with this process are fully equal to any nylon bearings made from nylon by any of the present standard techniques with respect to being free from any gross amount of strain. Tests have indicated that the tendency to seize is less than that of injection molded bearings and therefore they may be made to closer tolerances. Other articles which may be advantageously prepared by the process of this invention include various small, irregular shapes employed where the wear resistance and strength are important factors. Such articles include, but are not limited to, small rollers, cams, valve seats, gears, bushings, etc., and articles requiring good strength and wear-resisting characteristics.

As many apparently widely different embodiments of this invention may be made without departing from the spirit and scope thereof, it is to be understood that I do not limit myself to the specific embodiments thereof, as illustrated by the following examples, except as defined in the appended claims.

*Example I*

Two hundred and forty grams of virgin polyhexamethylene adipamide molding powder was dissolved in 1500 grams of ethylene glycol in a carbon dioxide atmosphere at 193° C. Six hundred and thirty-three grams of carbon black was added to this hot solution (equivalent to 66 percent carbon black by volume) and the solution was allowed to cool to 155° C. when it was then quenched with an excess of cold water. The co-precipitated carbon black-polymer mixture was then washed to remove the ethylene glycol and dried to give a fine powder with a fill ratio of 3.25 as compared with about 4 for the polymer of hexamethylene adipamide alone.

*Example II*

A portion of the powdered mixture made in Example I was pressed at room temperature at a pressure of 25 tons per square inch to give bushings with an inside diameter of about 0.5″, an outside diameter of 0.75″ and 0.75″ long. The bushings were removed in a green condition and one was heated in a vacuum to 263° C. while another was placed in a bath of Meprolene (a temperature-resistant hydrocarbon oil) heated to 263° C. After the bushings were heated throughout, they were removed and cooled. Breaking thrusts, determined by applying loads perpendicular to the long axes of the bushings, for the green bushings and for those sintered in vacuum and in Meprolene were 65, 175, and 140 pounds, respectively.

*Example III*

Three hundred sixty grams of polyhexamethylene adipamide was dissolved in 2500 grams of ethylene glycol in a carbon dioxide atmosphere at 193° C. Three hundred ninety grams of carbon black was added to this hot solution (equivalent to 40 percent carbon black by volume). The solution was quenched at 155° C. and the co-precipitated powder washed and dried as described in Example I. The powder had a fill ratio of 3:1.

*Example IV*

Bushings were made up from the powder of Example III as described in Example II. Breaking thrusts for the green bushings and for those sintered in vacuum and in Merprolene were 45, 125, and 120 pounds respectively.

Example V

Three hundred sixty grams of polyhexamethylene adipamide was dissolved in 1500 grams of ethylene glycol in a carbon dioxide atmosphere at 193° C. One hundred forty-seven grams of carbon black was added to this hot solution (equivalent to 20 percent carbon black by volume). The solution was quenched at 155° C. and the co-precipitated powder washed and dried as described in Example I. The powder had a fill ratio of 3.0.

Example VI

Bushings were made up from the powder of Example III as described in Example II. Breaking thrusts for the green bushings and for those sintered in vacuum and in Meprolene were 45, 120, and 105 respectively.

I claim:

1. A composition having a low fill ratio comprising a mixture of finely divided linear polyamide and carbon black, said linear polyamide being a polyamide which is soluble in phenol at room temperature and insoluble in ethylene glycol except at temperatures above about 140° C., and having an ultimate particle size of less than 40 microns, said carbon black being present in a concentration of 5 to 85 percent by bulk volume.

2. A composition in accordance with claim 1 wherein the carbon black is present in a concentration of 20 to 70 percent by bulk volume.

3. A composition having a low fill ratio comprising a mixture of finely divided linear polyamide and carbon black, said linear polyamide being a polyamide which is soluble in phenol at room temperature and insoluble in ethylene glycol except at temperatures above about 140° C., said mixture having been formed by adding said carbon black to a solution of said polyamide in ethylene glycol, cooling to co-precipitate the resulting mixture of polyamide and carbon black, and washing and drying said co-precipitated mixture, said carbon black being present in a concentration from 5 to 85 percent by bulk volume.

4. A shaped polyamide article comprising sintered synthetic linear polyamide particles and carbon black, said polyamide being one which is soluble in phenol at room temperature and insoluble in ethylene glycol except at temperatures above about 140° C., and having an average ultimate particle size of less than 40 microns, said carbon black constituting from 5 to 85 percent by total bulk volume of said article, said article being characterized by being bonded by sintering action alone.

References Cited in the file of this patent

UNITED STATES PATENTS

| | | |
|---|---|---|
| 2,345,533 | Graves | Mar. 28, 1944 |
| 2,592,616 | Stott et al. | Apr. 15, 1952 |
| 2,639,278 | Stott et al. | May 19, 1953 |
| 2,695,425 | Stott | Nov. 30, 1954 |
| 2,698,966 | Stott et al. | Jan. 11, 1955 |
| 2,748,099 | Bruner et al. | May 29, 1956 |